United States Patent
Nakasuga

(10) Patent No.: US 9,243,112 B2
(45) Date of Patent: Jan. 26, 2016

(54) METHOD FOR PRODUCING CARBONACEOUS MATERIAL-POLYMER COMPOSITE MATERIAL, AND CARBONACEOUS MATERIAL-POLYMER COMPOSITE MATERIAL

(71) Applicant: SEKISUI CHEMICAL CO., LTD., Osaka, Osaka (JP)

(72) Inventor: Akira Nakasuga, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 82 days.

(21) Appl. No.: 14/110,397

(22) PCT Filed: Oct. 12, 2012

(86) PCT No.: PCT/JP2012/076429
§ 371 (c)(1),
(2) Date: Oct. 7, 2013

(87) PCT Pub. No.: WO2013/077107
PCT Pub. Date: May 30, 2013

(65) Prior Publication Data
US 2014/0073746 A1    Mar. 13, 2014

(30) Foreign Application Priority Data
Nov. 21, 2011 (JP) ................................. 2011-254186

(51) Int. Cl.
*C08G 75/06* (2006.01)
*C08F 292/00* (2006.01)
(Continued)

(52) U.S. Cl.
CPC .............. *C08G 75/06* (2013.01); *C08F 292/00* (2013.01); *C08G 75/14* (2013.01); *C08J 7/16* (2013.01)

(58) Field of Classification Search
CPC .................................. C08G 75/06; B60C 1/00
USPC .......................................................... 525/535
See application file for complete search history.

(56) References Cited

U.S. PATENT DOCUMENTS 7,658,901 B2 *   2/2010   Prud'Homme et al. ... 423/415.1
2001/0036994 A1  11/2001  Bergemann et al.
(Continued)

FOREIGN PATENT DOCUMENTS

EP    2 612 889 A1    7/2013
EP    2 671 892 A1    12/2013
(Continued)

OTHER PUBLICATIONS

Machine Translation of JP 2002-322308.*
(Continued)

*Primary Examiner* — Mike M Dollinger
(74) *Attorney, Agent, or Firm* — Cheng Law Group, PLLC

(57) ABSTRACT

A method for producing a carbonaceous material-polymer composite material in which a polymer can be easily grafted to a carbonaceous material and a carbonaceous material-polymer composite includes the steps of: preparing a mixture containing a carbonaceous material and at least one polymer A of a polymer obtained by polymerizing a cyclic disulfide compound and a polymer obtained by polymerizing a cyclic disulfide compound and a radical polymerizable functional group-containing monomer; and heating the mixture at a temperature range of (D-75)° C. or higher and a decomposition termination temperature or lower when a decomposition start temperature of the polymer A is defined as D° C., and a carbonaceous material-polymer composite material obtained by the production method wherein a monomer and/or a polymer derived from the polymer A is grafted to a carbonaceous material.

15 Claims, 8 Drawing Sheets

(51) Int. Cl.
*C08G 75/14* (2006.01)
*C08J 7/16* (2006.01)

(56) References Cited

U.S. PATENT DOCUMENTS

| | | | |
|---|---|---|---|
| 2005/0175829 A1* | 8/2005 | Aoki et al. | 428/295.1 |
| 2006/0229404 A1* | 10/2006 | Lechtenboehmer | 524/495 |
| 2009/0078581 A1* | 3/2009 | Nair et al. | 205/440 |
| 2011/0135925 A1* | 6/2011 | Zhamu et al. | 428/367 |
| 2013/0296498 A1* | 11/2013 | Nakasuga et al. | 525/330.3 |

FOREIGN PATENT DOCUMENTS

| | | | |
|---|---|---|---|
| JP | 2000-191941 A | | 7/2000 |
| JP | 2001-311019 A | | 11/2001 |
| JP | 2002-154270 A | | 5/2002 |
| JP | 2002322308 A | * | 11/2002 |
| JP | 2006-312692 A | | 11/2006 |
| JP | 2006-325542 A | | 12/2006 |
| JP | 2011-127071 A | | 6/2011 |

OTHER PUBLICATIONS

Written Opinion of the International Searching Authority (PCT/ISA/237) for Application No. PCT/JP2012/076429 mailed Jan. 8, 2013 (English Translation mailed Jun. 5, 2014).
International Search Report for the Application No. PCT/JP2012/076429 mailed Jan. 8, 2013.
Written Opinion of the International Searching Authority (PCT/ISA/237) for Application No. PCT/JP2012/076429 mailed Jan. 8, 2013.
Nagata, Kazuhiro et al., "Preparation and dispersibility of polymer-grafted graphene oxide", Polymer Preprints, Japan, 2011, vol. 60, No. 1, p. 170.
Supplementary European Search Report for the Application No. EP 12 55 2044 dated Jul. 15, 2015.

* cited by examiner

METHOD FOR PRODUCING CARBONACEOUS MATERIAL-POLYMER COMPOSITE MATERIAL, AND CARBONACEOUS MATERIAL-POLYMER COMPOSITE MATERIAL

TECHNICAL FIELD

The present invention relates to a method for producing a carbonaceous material made by grafting a disulfide material having a functional group to a carbonaceous material, further relates to a method for producing a carbonaceous material-polymer composite material made by grafting a polymer to the carbonaceous material, and more particularly relates to a method for producing a carbonaceous material-polymer composite material using a depolymerizable cyclic disulfide compound that can be polymerized in an open container under normal pressure or a polymer made of the cyclic disulfide compound.

BACKGROUND ART

Conventionally, various composite materials made of a carbonaceous material such as carbon particles or carbon nano-tubes and a resin have been proposed. Improvement of strength and the like can be attained by forming a composite of a resin with these carbonaceous materials. Graphite is a hexagonal layered compound of $SP^2$ carbons, and one layer constituting graphite is referred to as graphene. Conventionally, in order to obtain graphene, a method for treating silicon carbide with heating and a method for laminating graphene onto a metal film such as copper foil by a CVD method have been known.

On the other hand, a method has been known in which oxidized graphene and exfoliated graphite that have less number of stacked graphene layers than the original graphite are obtained by treating graphite with strong acid, doping ions into interlayer of the graphite, and treating with rapid heating (Patent Document 1 described below).

In addition, conventionally, various composite materials made of exfoliated graphite obtained by delaminating graphite and a polymer have been studied. For example, Non-Patent Document 1 described below has reported that styrene polymer chains are grafted onto the surface of graphene when a polymerization initiator and a styrene monomer component are mixed in the presence of exfoliated graphite obtained by delaminating graphite by chemical treatment and the monomer is polymerized.

PRIOR ART DOCUMENTS

Patent Document

Patent Document 1: U.S. Pat. No. 7,658,901 B02

Non Patent Document

Non Patent Document 1: Polymer Preprints, Japan, Vol. 59 3Pb016

SUMMARY OF THE INVENTION

Problems to be Solved by the Invention

In a conventional carbonaceous material-polymer composite material obtained by blending a carbonaceous material with a polymer, the carbonaceous material and the polymer are not bonded. For this reason there has been a limitation of improvement in physical properties. On the other hand, when a polymer is grafted to a carbonaceous material, strength and the like of the composite material can be further improved because both are bonded with each other.

When the polymer is grafted to the carbonaceous material, however, a process for polymerizing the monomer in the presence of the carbonaceous material is complicated.

Particularly, when a polymer is grafted to exfoliated graphite among the carbonaceous materials by a method in which, after the exfoliated graphite is obtained, a polymerizable monomer or an initiator are grafted onto the surface, and then, a polymer is graft-polymerized using the grafted polymerizable monomer or initiator as a starting point, a problem that handling of exfoliated graphite as a raw material is cumbersome arises. That is, delaminated exfoliated graphite and graphene have light weight to such an extent that exfoliated graphite and delaminated graphene are floating in the air, and the handling of the exfoliated graphite after delamination are very difficult. For this reason, conventionally, exfoliated graphite has been re-dispersed in a solvent and a polymerization initiator that acts as a polymerization starting point has been added to the dispersion or a functional group having copolymerization reactivity has been grafted onto the surface of graphene. After this process, a polymer is grafted onto the surface of graphene by polymerization in the solution. Consequently, the process is complicated, and a very long period is needed for producing a grafted product.

Furthermore, when exfoliated graphite or a nano-carbon material is re-dispersed in a dispersion medium or a solvent, a slurry having high viscosity is obtained if a concentration of the slurry is high. For example, even about 1% by weight of exfoliated graphite is dispersed in a solvent or a dispersion medium, a slurry having significantly high viscosity or a hard aggregate is formed. For this reason, even stirring cannot be easily carried out without significant reduction of the concentration of the exfoliated graphite. Accordingly, it has been difficult to obtain a composite material made by grafting a polymer to exfoliated graphite. A production method that can easily graft a polymer to carbonaceous materials including exfoliated graphite thus has been desired.

A type of a polymer that is grafted to a carbonaceous material is also limited. A composite material that can provide various characteristics depending on the type of a functional group can be obtained when a polymer having a functional group as the polymer can be grafted to the carbonaceous material.

An object of the present invention is to provide a method for producing a carbonaceous material-polymer composite material in which a polymer can be easily grafted to a carbonaceous material and a carbonaceous material-polymer composite material in which a polymer is grafted to the carbonaceous material obtained by the production method.

Solutions to the Problems

As a result of intensive studies in order to achieve the object described above, the inventor of the present invention has found that when a polymer that is obtained by polymerizing a cyclic disulfide compound with heating is used, the polymer can be grafted to a carbonaceous material such as graphite or exfoliated graphite in relatively low temperature and in an open container under normal pressure, and has accomplished the present invention.

That is, a method for producing a carbonaceous material-polymer composite material according to the present invention comprises the steps of: preparing a mixture containing a carbonaceous material and at least one polymer A of a polymer obtained by polymerizing a cyclic disulfide compound and a polymer obtained by polymerizing a cyclic disulfide compound and a radical polymerizable functional group-containing monomer; and heating the mixture at a temperature range of (D-75) ° C. or higher to a decomposition termination temperature or lower when a decomposition start temperature of the polymer A is defined as D° C. In the present invention, a temperature at which 10% by weight of the polymer A is decomposed is defined as a decomposition start temperature, and a temperature at which 90% by weight of the polymer A is decomposed is defined as a decomposition termination temperature. The measurement of the decomposition start temperature and the decomposition termination temperature can be identified by carrying out TG/DTA measurement under a nitrogen atmosphere.

A mixture made of the carbonaceous material and the polymer containing cyclic disulfide may be a polymer-carbon composite obtained by mechanically mixing the polymer obtained by polymerizing cyclic disulfide and a radical polymerizable functional group-containing monomer and the carbonaceous material.

The mixture may also be a polymer-carbon composite obtained by polymerizing a cyclic disulfide compound monomer containing the carbonaceous material with heating, and may also be a polymer-carbon composite obtained by polymerizing a monomer mixture made by mixing the carbonaceous material, the cyclic disulfide compound, and the radical polymerizable functional group-containing monomer in a co-existence state.

Further, the mixture may also be a polymer-carbon composite obtained in a manner that the radical polymerizable functional group-containing monomer is further mixed with the polymer-carbon composite obtained by polymerizing the carbonaceous material and the cyclic disulfide compound with heating and thereafter the mixture is polymerized again in a co-existence state.

The mixture may also be a polymer-carbon composite obtained by mixing a polymer-carbon composite obtained by polymerizing the carbonaceous material and the cyclic disulfide compound with heating and a polymer obtained by polymerizing the radical polymerizable functional group-containing monomer.

The cyclic disulfide compounds are spontaneously polymerized by heating to a temperature of about its melting point or higher to form a polymer. When the decomposition start temperature is defined as D° C., the polymer is partially decomposed by heating to a temperature of (D-75) ° C. or higher to form a monomer and to generate a radical. When the monomer is cooled to a temperature lower than the decomposition start temperature after the monomer is formed at a temperature of the decomposition start temperature or higher, the monomer is polymerized again to form the polymer. That is, a reaction proceeds in which the polymer is decomposed by heating to high temperature to generate the monomer, and a reaction occurs in which the decomposed monomer is polymerized again to generate the polymer by cooling and maintaining the reaction system in an intermediate temperature region of (D-75) ° C. or higher and lower than the decomposition start temperature.

In the so-called intermediate temperature region of (D-75) ° C. or higher and up to the decomposition start temperature when the decomposition start temperature is defined as D, polymerization and decomposition reversibly proceed. As a result, the mixture was heated at a high temperature of (D-75) ° C. or higher to generate a radical and a thermally decomposed monomer, an undecomposed polymer, and an oligomer can be grafted to the carbonaceous material by the action of the radical.

Hereinafter, in the present invention, a temperature region lower than the decomposition start temperature, a temperature region of decomposition start temperature or higher and the decomposition termination temperature or lower, and a temperature region higher than the decomposition termination temperature are defined as a first temperature region, a second temperature region, and a third temperature region, respectively. The intermediate temperature region is in the first temperature region and referred to a region of (D-75) to D° C. when the decomposition start temperature is defined as D° C.

In a certain aspect of the method for producing a carbonaceous material-polymer composite material according to the present invention, the step of preparing the mixture is carried out by mixing the carbonaceous material and the polymer A. As described above, in the production method of the present invention, the mixture may be obtained by, for example, a method for directly melting and mixing the polymer made of the cyclic disulfide compound with the carbonaceous material.

In other certain aspects of the method for producing a carbonaceous material-polymer composite material according to the present invention, the step of preparing the mixture comprises the steps of: obtaining the polymer A by polymerizing the cyclic disulfide compound with heating; and mixing the carbonaceous material before or after the polymerization of the cyclic disulfide compound. As described above, the mixture may be obtained by mixing the carbonaceous material with the polymer A after the cyclic disulfide compound as the monomer is polymerized by heating to obtain the polymer A, or the carbonaceous material may be mixed with the cyclic disulfide compound before the polymerization.

In another certain aspect of the method for producing a carbonaceous material-polymer composite material according to the present invention, the method further comprises the step of cooling the mixture to a temperature lower than (D-75) ° C. after the heating step when the decomposition start temperature of the polymer A is defined as D° C. Preferably, the method further comprises the step of repeating the heating step and the cooling step for a plurality of times. As described above, a chain length of the polymer A to be grafted can be easily controlled by repeating the heating step in which the mixture is heated to the temperature range of (D-75) ° C. or higher and the decomposition termination temperature or lower and the cooling step in which the mixture is cooled to a temperature lower than (D-75) ° C.

In further other certain aspects of the method for producing a carbonaceous material-polymer composite material according to the present invention, the cyclic disulfide compound is at least one compound selected from the group consisting of 1,2-dithiane represented by the following chemical formula (1), a lipoic acid represented by the following chemical formula (2), 1,2-dithiacyclodecane represented by the following chemical formula (3), 1,4-dihydro-2,3-benzodithine represented by the following chemical formula (4), dithiacyclopentane, 1,2-dithiacyclooctane, a lipoic amide, and derivatives thereof. According to the present invention, the polymer of the cyclic disulfide compound can be easily grafted to the carbonaceous material by using at least one of these cyclic disulfide compounds.

[Chemical Formula 1]

(1)

[Chemical Formula 2]

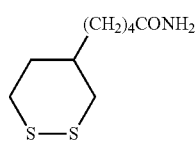
(2)

[Chemical Formula 3]

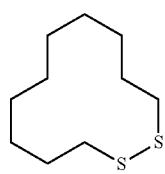
(3)

[Chemical Formula 4]

(4)

In further another certain aspect of the method for producing a carbonaceous material-polymer composite material according to the present invention, the cyclic disulfide compound has a functional group bonded to a carbon atom in a cyclic skeleton. In this case, a composite material having various physical properties can be provided using physical properties of the functional group.

As the cyclic disulfide compound having the functional group, at least one compound selected from the group consisting of an α-lipoic acid, a lipoic amide, and modified compound thereof can be preferably used.

In further another certain aspect of the method for producing a carbonaceous material-polymer composite material according to the present invention, two or more kinds of cyclic disulfide compounds are used as the cyclic disulfide compound. A carbonaceous material-polymer composite material that can provide various physical properties can be easily obtained by using two or more cyclic disulfide compounds.

In further another certain aspect of the method for producing a carbonaceous material-polymer composite material according to the present invention, two or more polymers A are used as the polymer A. A carbonaceous material-polymer composite material that can provide various physical properties can be also easily obtained by using two or more kinds of polymers A.

In further another certain aspect of the method for producing a carbonaceous material-polymer composite material according to the present invention, the radical polymerizable functional group-containing monomer is a vinyl group-containing monomer.

In further other certain aspects of the method for producing a carbonaceous material-polymer composite material according to the present invention, carbon dioxide or water in a supercritical state is added and mixed in at least a part of the heating step. In this case, a ratio of contact between the radical and the carbonaceous material can be increased by adding and mixing carbon dioxide or water in a supercritical state.

In further other certain aspects of the method for producing a carbonaceous material-polymer composite material according to the present invention, the mixture does not contain a polymerization initiator. That is, a monomer generated from the thermally decomposed polymer A can become a polymer by spontaneous polymerization without the polymerization initiator if the temperature is the decomposition termination temperature or lower. Accordingly, without using the polymerization initiator, polymerization and decomposition can be repeated as described above, and thus, the carbonaceous material-polymer composite material of the present invention can be provided.

In further another certain aspect of the method for producing a carbonaceous material-polymer composite material according to the present invention, the carbonaceous material is at least one material selected from the group consisting of exfoliated graphite, graphite, carbon particles, carbon nano-tubes, and fullerenes. As described above, various carbonaceous materials can be used in the present invention as the carbonaceous material. Preferably, graphite is used as the carbonaceous material. In this case, graphite can simultaneously form thin flakes to be formed into exfoliated graphite in the production method of the present invention. Accordingly, physical properties such as heat resistance and mechanical strength can be increased with a small amount of graphite because dispersibility of graphene in the composite material can be improved.

The carbonaceous material-polymer composite material according to the present invention is a material obtained by the production method according to the present invention, and has a feature in that a monomer and/or a polymer derived from the polymer A is grafted to the carbonaceous material.

Preferably, a monomer and/or a polymer derived from the polymer A having a functional group is grafted to the carbonaceous material and, in this case, the carbonaceous material-polymer composite material can provide various physical properties by the nature of the functional group.

Further preferably, the carbonaceous material described above is exfoliated graphite and, in this case, physical properties such as mechanical strength and heat resistance can be increased with a small amount of graphite.

Hereinafter, the present invention will be described in detail.

(Carbonaceous Material)

In the present invention, a carbonaceous material is used as a raw material. Examples of the carbonaceous material to be used include graphite, exfoliated graphite, carbon particles, carbon nano-tubes, and fullerenes can be used. In the present invention, these carbonaceous materials can be used singly or in combination of two or more materials. Preferably, graphite, exfoliated graphite, carbon particles, or carbon nano-tubes can be used as the carbonaceous material described above.

The carbonaceous material has a radical trapping property on its surface. Accordingly, a cyclic disulfide compound or the polymer A obtained by polymerization are easily grafted by using the radical trapping property of the surface.

As the carbonaceous material, exfoliated graphite is more preferably used. Graphite is a material having a radical trapping property on its surface. Graphite is a layered compound formed by stacking many layers of graphene. As used herein, "exfoliated graphite" is obtained by delaminating the graphite into each layer, and refers to a compound having fewer number of laminated layers of graphene than the original graphite. The number of laminated layers of graphene in exfoliated graphite is several layers to about 200 layers. Here, the number of laminated layers of graphene in graphite as a raw material is usually 1000 layers or more. The average number of laminated layers described above can be identified by calculating a specific surface area measured by the BET. If exfoliated graphite is completely made of one layer of graphene, the specific surface area is theoretically predicted to be 2400 to 2600 m² per gram.

The specific surface area of exfoliated graphite obtained by delaminating graphite into each layer may be about 2000 m². In this case, the average number of layers is one to two layers or less.

As a raw material for exfoliated graphite, graphite having an average area that is relatively as small as possible is suitable from the viewpoint of handleability. This graphite having a small average surface area is easily dispersed in a solution. Even though exfoliated graphite has a relative large diameter of about 10 μm square, grafting of the polymer A onto the surface and delamination into a single layer or a several layers of graphene can be attained.

The production method of the present invention does not require an oxidation step, and thus a carbonaceous material-polymer composite material having low oxygen content can be obtained. This makes it possible to obtain a polymer-carbon composite having high conductivity.

(Polymer A Obtained by Polymerizing Cyclic Disulfide Compound)

In the present invention, a polymer obtained by polymerizing a cyclic disulfide compound can be used as a polymer A used as a raw material. In the present invention, the cyclic disulfide compound refers to any compounds in which an S—S bonding, that is, a disulfide bonding constitutes a part of the cyclic skeleton. As the cyclic disulfide compound, at least one compound selected from the group consisting of 1,2-dithiane represented by the following chemical formula (1), a lipoic acid represented by the following chemical formula (2), 1,2-dithiacyclodecane represented by the following chemical formula (3), dihydro-2,3-benzodithine represented by the following chemical formula (4), dithiacyclopentane, 1,2-dithiacyclooctane, a lipoic amide, and derivatives thereof can be preferably used.

[Chemical Formula 5]

(1)

[Chemical Formula 6]

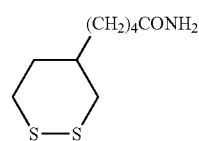

(2)

[Chemical Formula 7]

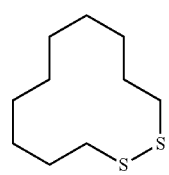

(3)

[Chemical Formula 8]

(4)

The derivatives described above are not particularly limited and examples thereof may include adequate compounds in which a hydrogen atom bonded to a carbon atom constituting the cyclic skeleton of the cyclic disulfide compound is substituted by other functional groups, such as 3,4-dihydro-1,2-dithiane; and the like.

In the present invention, preferably, a functional group-containing cyclic disulfide compound having a functional group bonded to a carbon atom in the cyclic skeleton is used. In this case, a polymer having the functional group is obtained by polymerization. For this reason, properties derived from the functional group can be provided to the resulting carbonaceous material-polymer composite material. Therefore, the elongation, strength, heat resistance and/or solvent dispersibility, etc. of the resulting carbonaceous material-polymer composite material can be improved.

The functional group is not particularly limited, and a carboxyl group, an amino group, a glycidyl group, and the like can be used. Preferably, a carboxyl group can be used as the functional group. In this case, a carbonaceous material-polymer composite material having various physical properties can also be provided by modifying the carboxyl group. Example of the cyclic disulfide compound having a carboxyl group may include α-lipoic acid, and the like.

The cyclic disulfide compound may be used singly or in combination of two or more compounds.

The cyclic disulfide compound is polymerized by heating without using a polymerization initiator to form a polymer. FIG. 1 is a graph illustrating a relation between a relative concentration by weight of the polymer, that is, conversion to the polymer (heating for 6 hours) and a processing temperature when an α-lipoic acid as the cyclic disulfide is heated. As illustrated in FIG. 1, in the case of an α-lipoic acid serving as one example of the cyclic disulfide compound, the α-lipoic acid is polymerized and converted to a polymer by heating to its melting point or higher temperature and a large part of the α-lipoic acid is converted to the polymer when the temperature exceeds 70° C. As described above, the polymer A used in the present invention, that is, the polymer obtained by polymerizing the cyclic disulfide compound can be easily obtained by heating the cyclic disulfide compound.

When the polymer A obtained by polymerizing the cyclic disulfide is further heated, the polymer A is decomposed to generate a polymer having shorter molecular chain than the original polymer A, an oligomer, or a monomer (hereinafter referred to as the "monomer and the like") and a radical is generated. Hereinafter, decomposition of the polymer A by heating will be described with reference to FIG. 2 using, as an example, polystyrene as another polymer that is grafted to the carbonaceous material by thermal decomposition.

FIG. 2 is a schematic chart of TG/DTA measurement under a nitrogen atmosphere using a polymer in order to illustrate a decomposition start temperature and a decomposition termination temperature of the polymer grafted to a carbonaceous material by thermal decomposition. When the polymer is heated to a first temperature region, which is its melting point or higher and lower than the decomposition start temperature, gradual decomposition of the polymer to the monomer and the like starts. Here, a temperature at which 10% by weight of the polymer A is decomposed is defined as the decomposition start temperature. When the polymer is further heated, the polymer is completely decomposed to generate the monomer. Here, a temperature at which 90% by weight of the polymer A is decomposed is defined as the decomposition termination temperature. According to the TG/DTA measurement illustrated in FIG. 2, the decomposition start temperature is estimated to be 260° C. and the decomposition termination temperature is estimated to be 300° C.

The decomposition start temperature and decomposition termination temperature of the polymer A of the present invention, which is grafted to the carbonaceous material by the thermal decomposition, can be also identified by TG/DTA measurement under a nitrogen atmosphere in a similar manner to the polystyrene.

The polymer A obtained by polymerizing the cyclic disulfide is gradually decomposed with heating the polymer A at (D-75) ° C. or higher when the decomposition start temperature of the polymer A is defined as D° C. When the polymer A is cooled to a temperature lower than (D-75) ° C. at which decomposition of the polymer A to the monomer and the like starts, the monomer and the like are polymerized again to generate the polymer. As described above, the decomposition of the polymer A to the monomer and the like by heating and the polymerization of the monomer and the like to the polymer by cooling reversibly proceed.

The polymer A obtained by polymerizing the cyclic disulfide causes decomposition and polymerization of the polymer in parallel in the intermediate temperature region of (D-75) ° C. or higher and up to the decomposition start temperature when the decomposition start temperature of the polymer A is defined as D° C. That is, in the intermediate temperature region, the monomer and the like generated by decomposition of the polymer A are polymerized again to generate the polymer and the polymer is also decomposed again to generate the monomer and the like, with a radical being generated. As described above, in the intermediate temperature region, decomposition and polymerization of the polymer are repeated and the monomer or a polymer radical is repeatedly generated.

As described above, the cyclic disulfide compound completes polymerization in a low temperature region and the polymer obtained by polymerizing the cyclic disulfide compound starts thermal decomposition at a temperature 75° C. lower than the decomposition start temperature. As a result, a temperature at which grafting to the carbonaceous material by thermal decomposition occurs is relatively low. Therefore, a sealed container is not required and the polymer A can be grafted to the carbonaceous material in a normal pressure reaction vessel, which has been conventionally and generally used. That is, pressurization is not required.

(Polymer A Obtained by Polymerizing Cyclic Disulfide Compound and Radical Polymerizable Functional Group-Containing Monomer)

In the present invention, a polymer obtained by polymerizing the cyclic disulfide compound and a radical polymerizable functional group-containing monomer can also be used as the polymer A used as a raw material. The radical polymerizable functional group-containing monomer mentioned herein is not particularly limited as long as the monomer has a functional group generally known as a radical polymerizable functional group and a monomer having adequate radical polymerizable functional group can be used.

Examples of the monomer having a radical polymerizable functional group may include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylic esters made of α-acetoxystyrene, vinyl monomers having a hydroxyl group or glycidyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl (meth)acrylate, and dimethylaminoethyl(meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethyl phthalic acid; monomers having a phosphoric acid group such as Phosmer M, Phosmer CL, Phosmer PE, Phosmer MH, and Phosmer PP, manufactured by Uni-Chemical Co., Ltd.; monomers having an alkoxysilyl group such as vinyltrimethoxysilane and 3-methacryloxypropyltrimethoxysilane; (meth)acrylate monomers having an alkyl group, a benzyl group, or the like; and the like.

In the polymer A obtained by polymerizing the cyclic disulfide compound and the radical polymerizable functional group-containing monomer, the cyclic disulfide compound is used as a raw material for polymerization. For this reason, similar to the polymer A obtained by polymerizing the cyclic disulfide, this polymer A starts to decompose at (D-75) ° C. or higher and causes decomposition and polymerization of the polymer in parallel in the intermediate temperature region of (D-75) ° C. or higher and up to the decomposition start temperature when the decomposition start temperature of the polymer A is defined as D° C.

A formulation ratio between the cyclic disulfide compound and the radical polymerizable functional group-containing monomer that are raw materials for polymerization of the polymer A is not particularly limited. The ratio is preferably 1000 parts by weight or less of the radical polymerizable functional group-containing monomer to 100 parts by weight of the cyclic disulfide compound. When the amount of the radical polymerizable functional group-containing monomer exceeds the ratio described above, the grafting efficiency of the polymer A to the carbonaceous material is reduced.

(Specific Description of Production Method)

In the present invention, first, the step of preparing a mixture containing the carbonaceous material and the polymer A is carried out. In this case, as described above, the polymer A may be the polymer obtained by polymerizing the cyclic disulfide compound or may be the polymer obtained by polymerizing the cyclic disulfide compound and the radical polymerizable functional group-containing monomer.

A method for preparing the mixture is not particularly limited. For example, the mixture may be prepared by mixing the carbonaceous material and the polymer A. Alternatively, the mixture may be prepared by polymerizing the cyclic disulfide compound by heating in the first temperature region to obtain a polymer, and thereafter mixing the polymer with the carbonaceous material. Alternatively, the mixture may be prepared by mixing the cyclic disulfide compound and the carbonaceous material and carrying out polymerization by heating in the first temperature region to obtain a polymer, and thereafter mixing a composite made of the cyclic disulfide compound and the carbonaceous material with the polymer. Furthermore, the mixture may be prepared by mixing the carbonaceous material with the cyclic disulfide compound or the cyclic disulfide compound and the radical polymerizable functional group-containing monomer before polymerization, and thereafter, polymerizing the cyclic disulfide compound by heating.

A formulation ratio between the carbonaceous material and the polymer A is not particularly limited, but is desirably 50:50 to 0.01:99.99 in a weight ratio. When the carbonaceous material is mixed with the cyclic disulfide compound or the cyclic disulfide compound and the radical polymerizable functional group-containing monomer before polymerization, a formulation ratio between the carbonaceous material and the cyclic disulfide compound or the total of the cyclic disulfide compound and the radical polymerizable functional group-containing monomer is desirably 50:50 to 0.01:99.99 in a weight ratio. When the polymer A and the carbonaceous material are directly mixed, a mixed ratio between the carbonaceous material and the polymer A is desirably 50:50 to 0.5:99.5 in a weight ratio.

As the polymer A, two or more kinds of polymers A may be used. The polymer A may be obtained by using two or more kinds of the cyclic disulfide compounds. This also makes it possible to obtain a carbonaceous material-polymer composite material formed by mixing a polymer obtained by polymerizing a plurality of polymers or a plurality of cyclic disulfide compounds with the carbonaceous material.

One or more cyclic disulfide compounds, that is, the monomer, and one or more polymers may be used in combination. That is, the mixture may contain one or more cyclic disulfide compounds, that is, the monomer.

In the present invention, the mixture obtained as described above is heated to the temperature region of (D-75) ° C. or higher and the decomposition termination temperature when the decomposition start temperature of the polymer A is defined as D° C.

The polymer A is decomposed to generate the monomer and the like and a high concentration radical is generated by heating the mixture to (D-75) ° C. or higher when the decomposition start temperature of the polymer A is defined as D° C. The carbonaceous material has a radical trapping property. Therefore, when the carbonaceous material is heated to (D-75) ° C. or higher, the generated radicals are trapped on the surface of the carbonaceous material, and thus, the monomer or the polymer radical generated by decomposition is grafted onto the surface of the carbonaceous material. Therefore, the polymer radical generated from the cyclic disulfide compound monomer and/or the polymer A can be grafted onto the surface of the carbonaceous material.

The heating method is not particularly limited, and in the present invention, as described above, the polymer A can be finally grafted to the carbonaceous material only by heating without sealing, that is, under normal pressure. Therefore, the carbonaceous material-polymer composite material of the present invention can be easily provided at a low price.

In addition, the step of oxidizing the carbonaceous material is not required when the polymer A is grafted to the carbonaceous material. For this reason, an oxygen content can be reduced. Therefore, conductivity of the carbonaceous material is difficult to be reduced.

When the mixture is heated at a temperature exceeding the decomposition termination temperature, the cyclic disulfide compound monomer generated by the decomposition of the polymer A may be released out of the reaction system as gas. Therefore, the heating temperature is in a range of (D-75) ° C. or higher and the decomposition termination temperature or lower when the decomposition start temperature of the polymer A is defined as D° C.

In the case where relatively long polymer chains are grafted to the carbonaceous material, a preferable hating temperature is a temperature in the intermediate temperature region of (D-75) ° C. or higher and up to the decomposition terminate temperature when the decomposition start temperature is defined as D° C. In the intermediate temperature region, re-polymerization of the monomer generated by decomposition of the polymer proceeds in parallel with the decomposition of the polymer described above. For this reason, decomposition and polymerization of the polymer are repeated, and thus, the monomer or the polymer radical are repeatedly generated. Therefore, for example, in the case of α-lipoic acid, the polymer can be grafted to the carbonaceous material in high efficiency by heat treatment for a long period at a temperature of about 160° C. to 235° C., which is lower than the decomposition start temperature in the intermediate temperature region.

In the present invention, after the heating step, the step of cooling to a temperature lower than the decomposition start temperature, that is, to the first temperature region may be carried out. This makes it possible to polymerize the monomer and the like again. The polymer obtained by polymerization again is decomposed to the monomer and the like again by carrying out a further heating step to be able to generate a high concentration radical. This makes it possible to effectively graft the polymer A to the carbonaceous material.

In the present invention, the heating step and the cooling step may be repeated for a plurality of times. This makes it possible to adjust a chain length of the polymer to be grafted.

When the polymer is cooled to a temperature lower than the decomposition start temperature and additional other polymerizable monomers are optionally added to the grafted cyclic disulfide monomer or polymer to polymerize this mixture, various polymers can be grafted to the carbonaceous material.

In the production method of the present invention, when graphite is used as the carbonaceous material, a radical generated when heating to a temperature of the decomposition start temperature or higher attacks the surface and edge of the graphite. Accordingly, the graphite delaminates and formation of thin flakes proceeds. In this case, the step of obtaining exfoliated graphite by delamination of graphite can be simultaneously achieved. Therefore, the carbonaceous material-polymer composite material of the present invention can be obtained in which the polymer is grafted to exfoliated graphite. As described above, the carbonaceous material as a material to be used in the production method of the present invention and the carbonaceous material that is grafted in the resulting carbonaceous material-polymer composite material may have different forms.

The carbonaceous material-polymer composite material obtained by the production method of the present invention may be in a form where a polymer having no graft is added. After the carbonaceous material-polymer composite material to which the polymer having no graft is added is obtained, the carbonaceous material-polymer composite material may be purified by removing the polymer having no graft, if necessary.

Some polymers generate a residue that is difficult to be thermally decomposed at a temperature higher than the decomposition termination temperature. In this case, the decomposition start temperature and the decomposition termination temperature are identified as follows. That is, as illustrated in FIG. 2, the decomposition start temperature is a temperature of $(X-R)/(A-R)=0.9$ and the decomposition termination temperature is a temperature of $(Y-R)/(A-R)=0.1$, where a weight of decomposed residue is defined as R; a maximum weight of the polymer in the first temperature region is defined as A; a weight of the polymer at the decomposition start temperature is defined as X; and a weight of the polymer at the decomposition termination temperature is defined as Y.

In the polymer used for TG/DTA measurement, an unreacted monomer that is not polymerized or a residual solvent or both of them may remain. In this case, the decomposition start temperature is a temperature of $(X-N)/(A-N)=0.9$ and the decomposition termination temperature is a temperature of $(Y-N)/(A-N)=0.1$, where a total weight of the unreacted monomer and the residual solvent is defined as N; a maximum weight of the polymer in the first temperature region is defined as A; a weight of the polymer at the decomposition start temperature is defined as X; and a weight of the polymer at the decomposition termination temperature is defined as Y.

Further, when the polymer that generates a decomposed residue contains an unreacted monomer or a residual solvent or both of them, the decomposition start temperature is a temperature of $(X-R-N)/(A-R-N)=0.9$ and the decomposition termination temperature is $(Y-R-N)/(A-R-N)=0.1$.

As one example, a relation between heating temperature and relative concentration by weight of a polymer, in the case of the system where a residue that is difficult to be decomposed remains, is illustrated in FIG. 3. FIG. 3 illustrates the case where a polymer of an α-lipoic acid compound is used as the polymer. As illustrated in FIG. 3, the polymer contains an unreacted monomer. In the first temperature region, a decomposition rate of the polymer is slow, but in the intermediate temperature region of the first temperature region, decomposition and polymerization of the polymer occur in parallel. When the polymer is heated to the second temperature region, polymerization is terminated, decomposition of the polymer is preferentially carried out, and the polymer starts to decompose to generate the monomer and to generate the radical. Further, when the polymer is heated to the third temperature region, the polymer is decomposed and generates the monomer and a decomposed residue. In consideration of a weight of the decomposed residue R and a total weight of the unreacted monomer and the residual solvent N, the decomposition start temperature and the decomposition termination temperature may be defined according to the above formula.

Here, when the decomposed residue is not generated even if the polymer is heated to the third temperature region in the formula described above, R is equal to 0. Similarly, in the case of a polymer that does not contain any of the unreacted monomer and the residual solvent, N is equal to 0. Accordingly, the formula defining the decomposition start temperature and the decomposition termination temperature can be applied to polymers that do not generate the decomposed residue.

Preferably, supply of an inert gas at the heating step is also desirable in order to increase probability of contact between the generated radical and the carbonaceous material. Examples of the inert gas may include nitrogen, carbon dioxide gas, and argon gas. Further, it is also desirable that a fluid that becomes supercritical state by heating is supplied to the mixture to carry out the heating step. This makes it possible to further increase the contact probability between the generated radical and the carbonaceous material. Examples of the supercritical state fluid may include carbon dioxide and water that become a supercritical state by heating and have no radical trap property. In order to further increase the contact probability between the radical and the carbonaceous material, heating treatment maintaining at $(D-75)$ °C. or higher may be repeated when the decomposition start temperature of the polymer A is defined as D° C.

(Carbonaceous Material-Polymer Composite Material)

The carbonaceous material-polymer composite material of the present invention is obtained by the production method of the present invention and the monomer and/or the polymer derived from the polymer A is grafted to the carbonaceous material. Here, the monomer or polymer derived from the polymer A is the monomer and the like, that is, a polymer having shorter molecular chains than the molecular chains of the original polymer A, an oligomer, or a monomer.

The carbonaceous material-polymer composite material of the present invention has improved elongation, strength, heat resistance and/or solvent dispersibility because the monomer and the like are grafted to the carbonaceous material.

Preferably, a graft ratio in the carbonaceous material-polymer composite material is 2% or more. By setting the graft ratio to 2% or more, physical properties such as elongation, strength, heat resistance and/or solvent dispersibility of the carbonaceous material-polymer composite material can be effectively improved. When the graft ratio is less than 2%, the physical properties of the carbonaceous material-polymer composite material described above may not be sufficiently improved.

In the present invention, the graft ratio of the carbonaceous material-polymer composite material refers to a ratio of weights of the monomer and the polymer directly chemically bonding to the carbonaceous material by grafting to a weight of the carbonaceous material.

Preferably, the monomer and the like derived from the polymer A having a functional group is grafted to the carbonaceous material as described above. When the monomer and the like derived from the polymer A having a functional group is grafted to the carbonaceous material, various physical properties derived from the functional group can be provided. For example, when a monomer and the like derived from a polymer A having a hydrophilic functional group are grafted, dispersibility to a water-based medium such as water can be improved. Alternatively, when a monomer and the like derived from a polymer A having a hydrophobic functional group are grafted to the carbonaceous material, dispersibility to a hydrophobic organic solvent can also be improved. A monomer and the like derived from a plurality types of the polymers A can be grafted, and thus, a composite material having various physical properties can be provided.

More preferably, the monomer and the like derived from the polymer A or the polymer A having a functional group are grafted to exfoliated graphite as the carbonaceous material. In this case, exfoliated graphite has a larger specific surface area than graphite, and thus, physical properties such as heat resistance and strength of the composite material can be significantly improved by adding a small amount of exfoliated graphite.

Advantages of the Invention

In the method for producing a carbonaceous material-polymer composite material according to the present invention, the polymer can be grafted onto the surface of the carbonaceous material by only preparing the mixture containing the carbonaceous material-polymer composite material and the polymer A, followed by heating. Further, the polymer A is a polymer obtained by polymerizing a composition containing the cyclic disulfide compound, and thus, decomposition and polymerization of the polymer A by heating the mixture proceed in relatively low temperature. For this reason, the polymer can be grafted to the carbonaceous material using an open container under normal pressure. As a result, the carbonaceous material-polymer composite material can be provided by only controlling the temperature in a simple facility and without carrying out a graft polymerization process for a long period.

Further, the method for producing a carbonaceous material-polymer composite material according to the present invention is a solvent-free process, and thus, an amount of discharged volatile organic compound can be reduced. In addition, a process for oxidizing the carbonaceous material is not necessary. As a result, a carbonaceous material-polymer composite material having excellent conductivity can also be also provided.

The carbonaceous material-polymer composite material according to the present invention is obtained by the production method of the present invention, and the monomer and/or the polymer derived from the polymer A is grafted to the carbonaceous material, and thus, physical properties of the carbonaceous material-polymer composite material can be improved.

MODE FOR CARRYING OUT THE INVENTION

Figure 1:
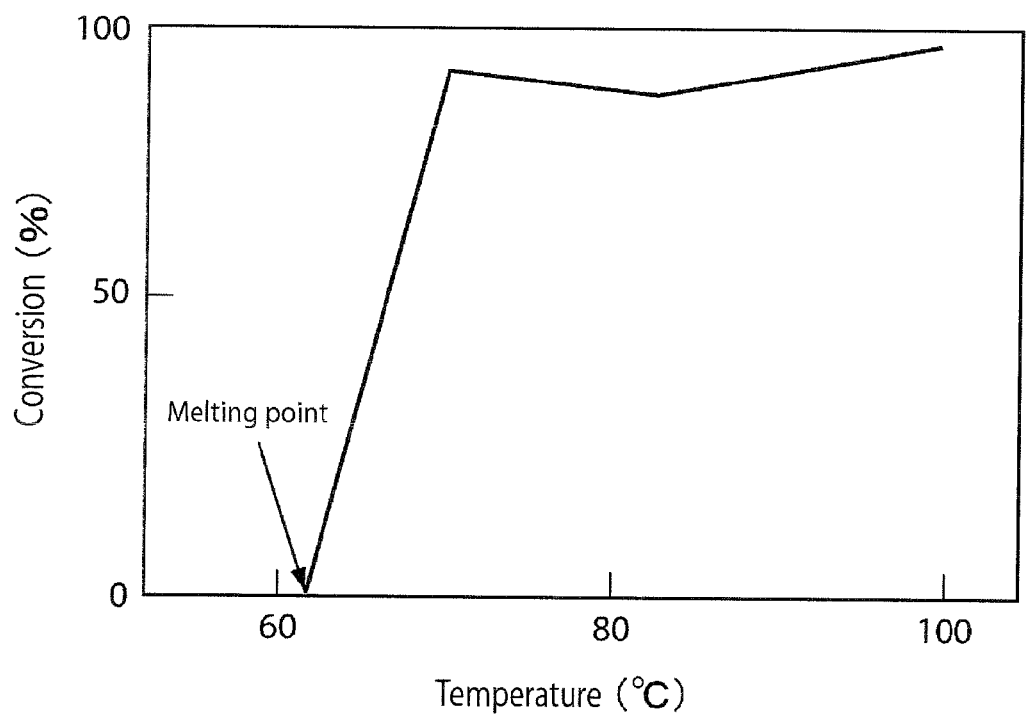
FIG. 1 is a graph illustrating a relation between heating temperature and conversion to a polymer when an α-lipoic acid as a monomer is used to be polymerized.
Figure 2:
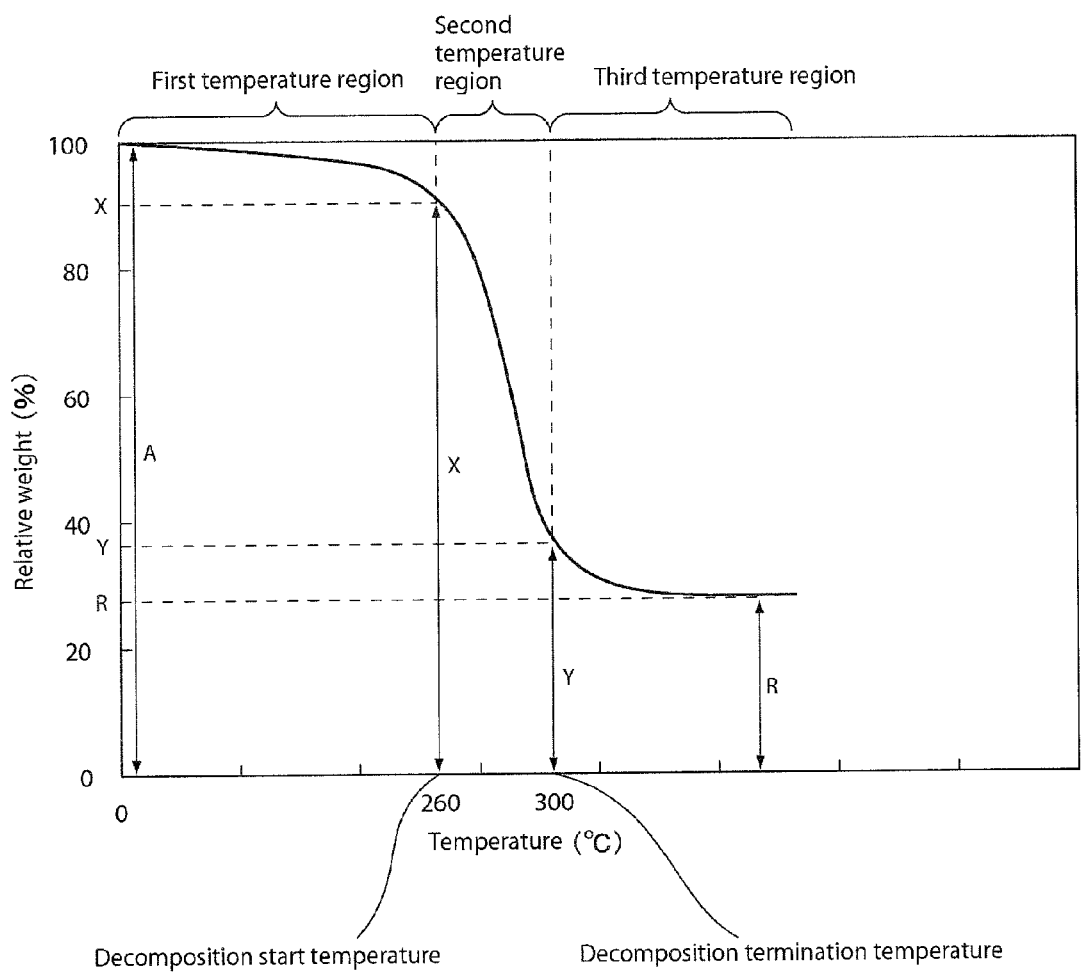
FIG. 2 is a schematic chart of TG/DTA measurement under a nitrogen atmosphere using a polymer in order to illustrate a decomposition start temperature and a decomposition termination temperature of the polymer grafted to a carbonaceous material by thermal decomposition.
Figure 3:
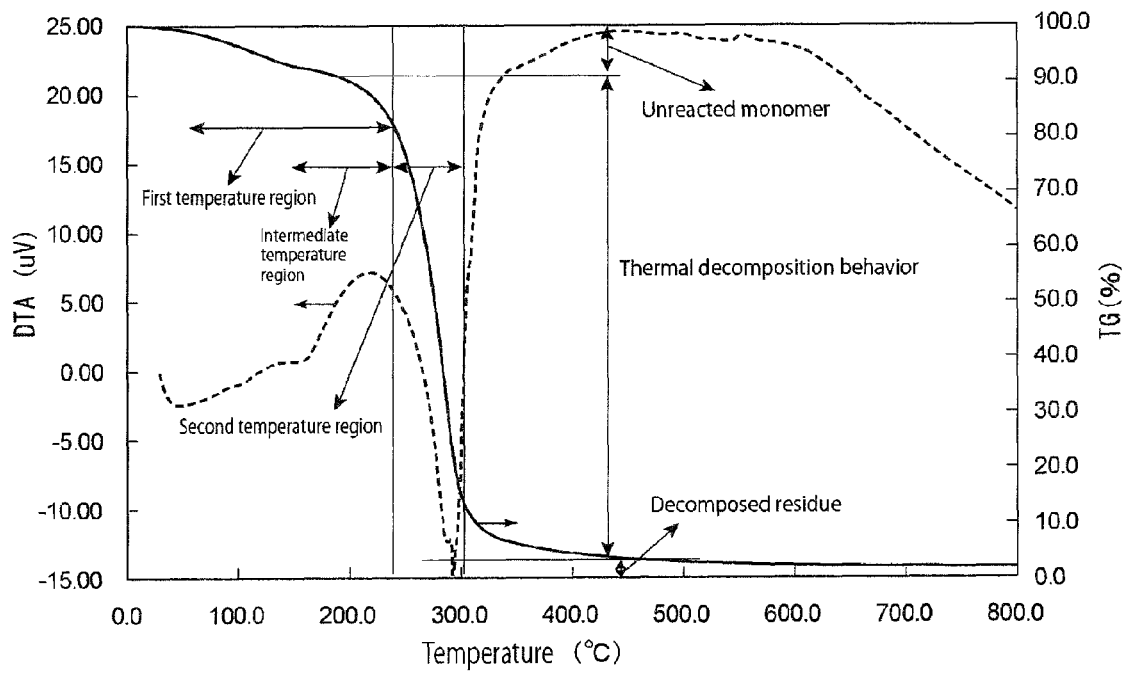
FIG. 3 is a chart when TG/DTA measurement is carried out under a nitrogen atmosphere when an α-lipoic acid as a monomer is used to be polymerized.

Hereinafter, specific Examples and Comparative Examples of the present invention will be described. The present invention, however, is not limited to Examples described below.

(Evaluation Methods)

For Examples and Comparative Examples described below, any one of the following evaluation methods 1) to 5) was used and Examples and Comparative Examples were evaluated.

Evaluation Method 1): XRD Measurement

A dispersed solution containing graphite was dropped on a slide glass and the dropped dispersed solution was dried at room temperature. X-ray diffraction measurement was carried out using X-ray diffractometer Rint 1000 manufactured by Rigaku Corporation.

A diffraction was obtained by a 2θ-θ method using Cu as a target and setting an X-ray tube voltage and an X-ray tube current to 50 kV and 150 mA, respectively. A scintillation counter was used as a detector and samples were scanned at a speed of 0.2 degrees/minute.

Evaluation Method 2): TG/DTA Measurement

Graphite or exfoliated graphite in an amount of 2 to 10 mg was precisely weighed and TG/DTA was measured using TG/DTA 6300 manufactured by SII Nano Technology Inc.

An initial temperature was set to 25° C. and the temperature was raised to 800° C. at a temperature rising rate of 10° C. per minute.

The decomposition start temperature and the decomposition termination temperature were measured under a nitrogen gas atmosphere at a gas flow rate of 50 ml/minute.

A polymer grafting ratio was measured under an air atmosphere at a gas flow rate of 50 ml/minute.

Evaluation Method 3): Measurement of Polymer Adsorption Ratio to Exfoliated Graphite The obtained samples in an amount of 1 to 10 g were dissolved in a solvent having a weight of 50 times or more weight of the sample. Dispersion treatment was carried out using an ultrasonic device at an output of 45 kHz and 100 W at room temperature for 30 minutes.

The obtained solution was filtered using PTFE-T300A090C having a pore size of 3 μm manufactured by Advantech Japan, Co., Ltd. with aspirator suction. The same amount of a solvent as that of the solution was added and the obtained solution was filtered again as washing filtration of an unreacted polymer to graphene.

The sample on the filter paper was dried in an oven to remove the contained solvent.

The TG/DTA measurement of the evaluation method 2) was carried out using the sample.

Evaluation Method 4): BET Measurement Method

A specific surface area of the obtained composite material was measured by a specific surface area measuring apparatus ASAP-2000 manufactured by SHIMADZU CORPORATION using nitrogen gas.

Comparative Example 1

As raw material graphite, ground exfoliated graphite, manufactured by Toyo Tanso Co., Ltd., product name: PF8F, was prepared.

Into a glass sample bottle, 10 mg of the ground exfoliated graphite and 20 ml of THF were charged and ultrasonic treatment was carried out. As an ultrasonic treatment apparatus, W-113 SANPA manufactured by Honda Electronics was used. The ultrasonic treatment was carried out at an output of 100 W and an oscillating frequency of 28 kHz for 30 minutes. A coarsely dispersed solution was obtained in which particles were visually observed. XRD measurement of this dispersed solution was carried out in accordance with the evaluation method 1) described above.

Figure 4:
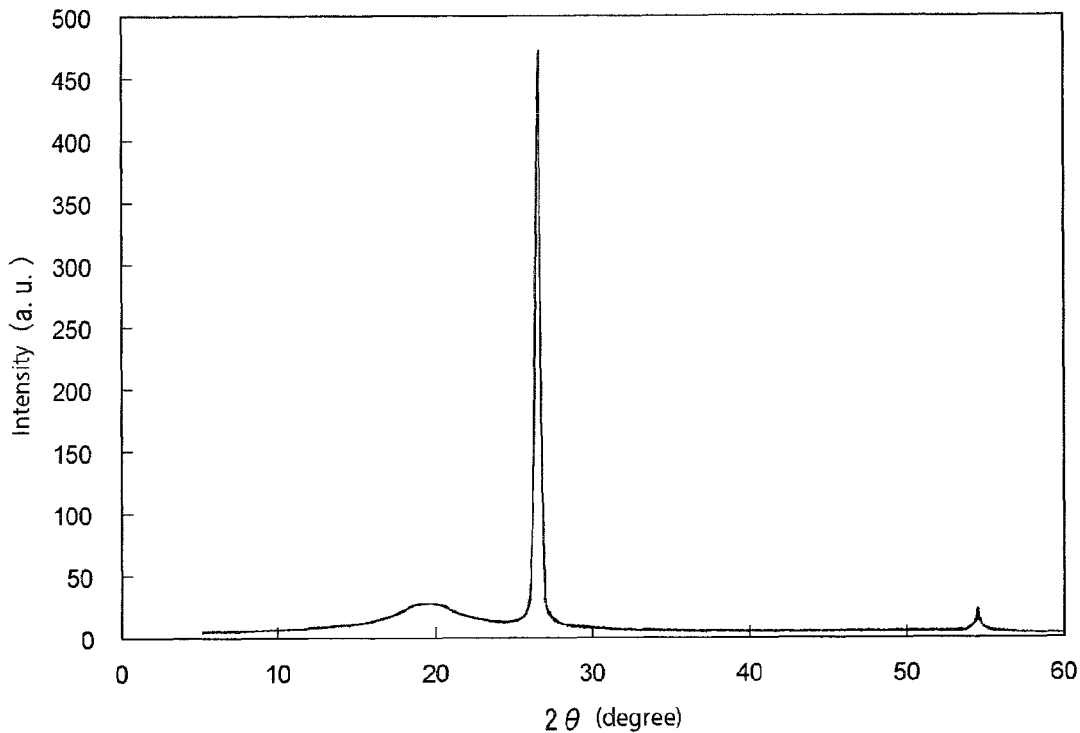
FIG. 4 is a chart illustrating an XRD spectrum of a dispersed solution obtained in Comparative Example 1.

The obtained result is shown in FIG. 4. A peak due to graphite layer crystal was observed at about 26.4 degrees.

Into a flask having a capacity of 100 ml, 51.4 mg of the ground exfoliated graphite, 10.5 g of decalin, and 2.7 g of an α-lipoic acid were charged and ultrasonic treatment was carried out to obtain a dispersed mixture. In the ultrasonic treatment, W-113 SANPA manufactured by Honda Electronics was used, and the treatment was carried out at an output of 100 W and an oscillating frequency of 28 kHz for 30 minutes.

The flask was immersed into an oil bath and the temperature of the oil bath was raised to 100° C. to heat for 4 hours while stirring the mixture with a stirrer. Polymerization of the α-lipoic acid proceeded and the dispersed mixture became viscous. Thereafter, the dispersed mixture was allowed to cool overnight and a recovery flask 1 was detached from the reflux apparatus.

To this flask, 100 g of tetrahydrofuran was added and mixed with the dispersed mixture and the resultant mixture was treated with ultrasonic wave. As an ultrasonic treatment apparatus, W-113 SANPA manufactured by Honda Electronics was used. The treatment was carried out at an output of 100 W and an oscillating frequency of 28 kHz for 60 minutes.

The dispersed mixture having black color was taken out and filtered using PTFE-T300A090C having a pore size of 3 μm manufactured by Advantech Japan, Co., Ltd. with aspirator suction. A filter residue was re-dispersed in THF and dried at 80° C. for 2 hours, and thereafter, TG/DTA measurement was carried out under an air atmosphere.

Figure 5:
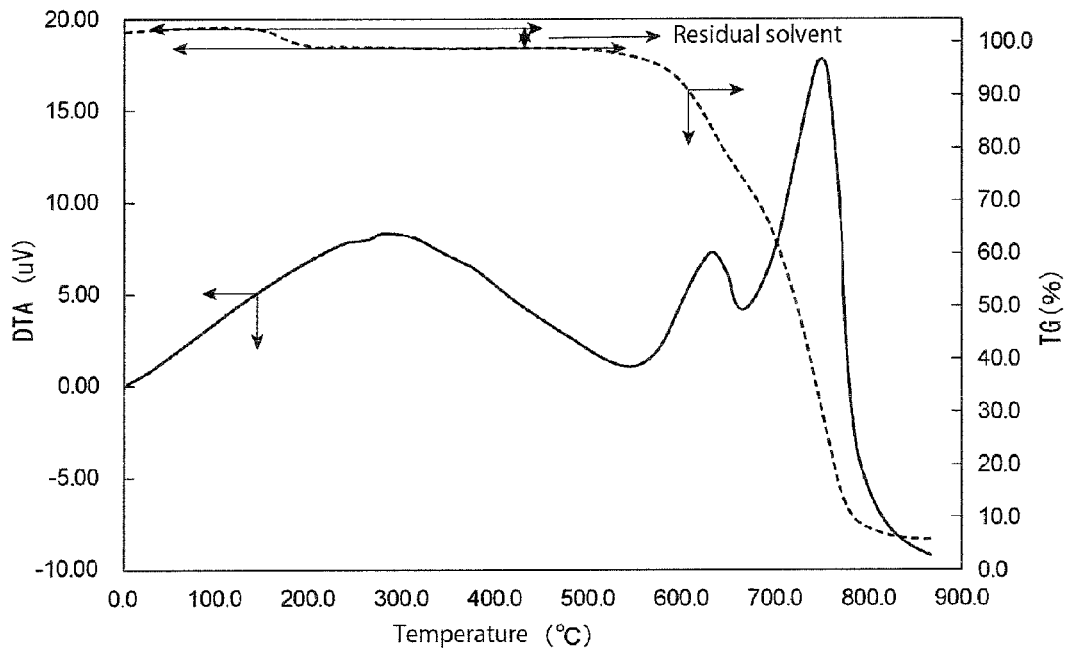
FIG. 5 is a chart illustrating TG/DTA measurement result of exfoliated graphite obtained in Comparative Example 1.

The obtained result is shown in FIG. 5. As shown in FIG. 5, a peak due to exfoliated graphite was 97%; a peak of a residual solvent (decalin) was 3%; and a peak due to a grafted α-lipoic acid was 1% or less.

Comparative Example 2

Into a flask having a capacity of 100 ml, 50.0 mg of the ground exfoliated graphite, 10 g of decalin, and 2.7 of an α-lipoic acid were charged and ultrasonic treatment was carried out to obtain a dispersed mixture. In the ultrasonic treatment, W-113 SANPA manufactured by Honda Electronics was used, and the treatment was carried out at an output of 100 W and an oscillating frequency of 28 kHz for 30 minutes.

The flask was immersed into an oil bath and the temperature of the oil bath was raised to 150° C. to heat for 4 hours while stirring the mixture with a stirrer. Polymerization of the α-lipoic acid proceeded and the dispersed mixture became viscous. Thereafter, the dispersed mixture was allowed to cool overnight and a recovery flask 1 was detached from the reflux apparatus.

To the flask, 50 g of toluene was added and mixed with the dispersed mixture and the resultant mixture was treated with ultrasonic wave. As an ultrasonic treatment apparatus, W-113 SANPA manufactured by Honda Electronics was used. The treatment was carried out at an output of 100 W and an oscillating frequency of 28 kHz for 60 minutes.

The dispersed mixture having black color was taken out and filtered using PTFE-T300A090C having a pore size of 3 μm manufactured by Advantech Japan, Co., Ltd. with aspirator suction. A filter residue was dried at 80° C. for 2 hours, and thereafter, TG/DTA measurement was carried out under an air atmosphere.

Figure 6:
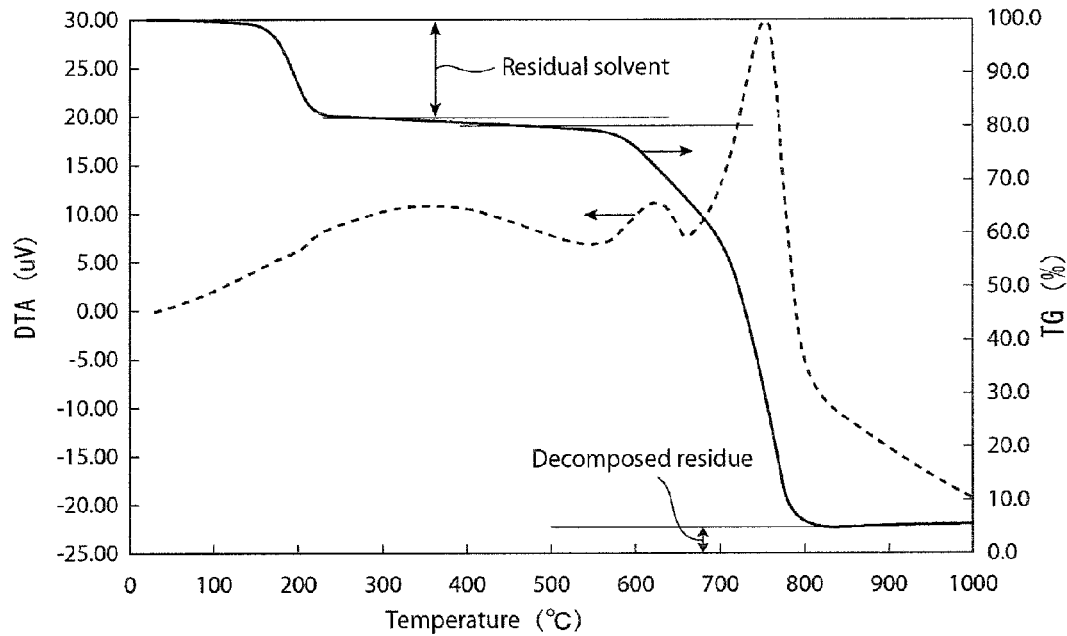
FIG. 6 is a chart illustrating TG/DTA measurement result of exfoliated graphite obtained in Comparative Example 2.

The obtained result is shown in FIG. 6. As shown in FIG. 6, a peak of a residual solvent was 20%; a peak due to exfoliated graphite was 74%; a peak of a decomposed residue was 4.5%; and a peak due to a grafted α-lipoic acid was 1.5% or less.

Example 1

Preparation of Graphene and Graft of Disulfide

A low density graphite sheet having a density of 0.7 and a thickness of 1 mm manufactured by Toyo Tanso Co., Ltd., product number: PF100-UHP, was prepared as a raw material.

The sheet-shaped graphite was cut into a size of 3 cm×3 cm to obtain sheet-shaped graphite as an electrode material. Slits having a length of 1 cm and a width of 1 cm were formed by cutting the sheet-shaped graphite with a cutter knife. Into the sheet-shaped graphite in which the two slits were formed, an electrode made of Pt was inserted. Thus prepared sheet-shaped graphite was used as a working electrode (anode), and the working electrode was immersed into an aqueous nitric acid solution having a concentration of 60% by weight together with a control electrode (cathode) made of Pt and a reference electrode made of Ag/AgCl to carry out electrochemical treatment by applying direct-current voltage.

At the time of the electrochemical treatment, a current value was fixed so as to be 0.7 A and the direct-current voltage was applied for 2 hours. As described above, the graphite used as the working electrode that was anode gradually swelled, and the thickness was increased several times thicker.

Figure 7:
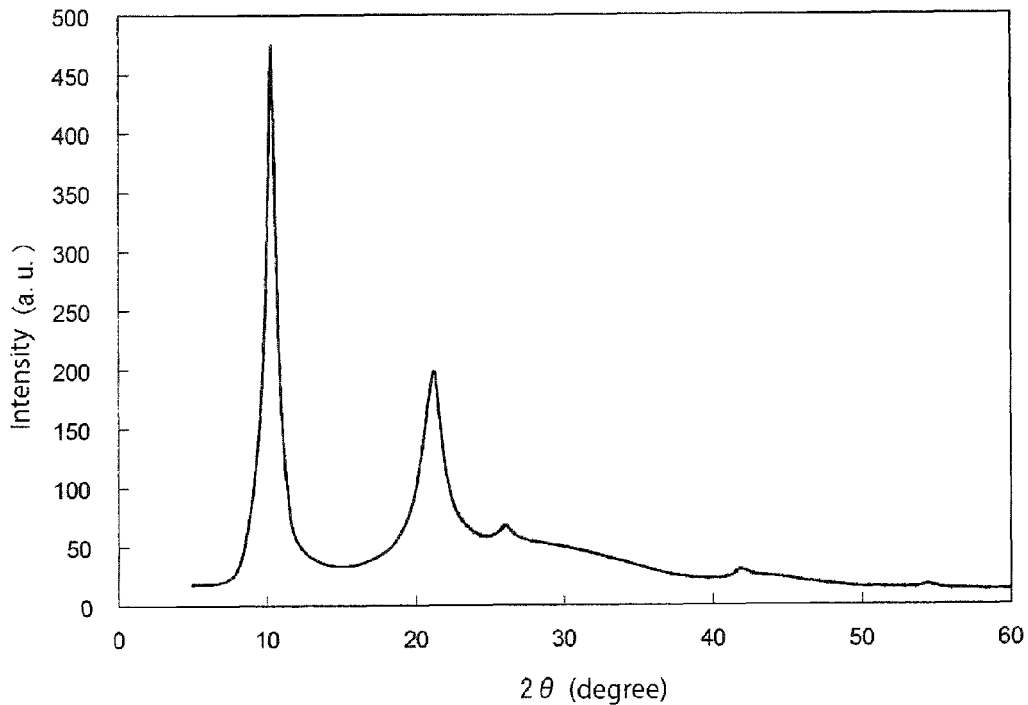
FIG. 7 is a chart illustrating an XRD spectrum of exfoliated graphite obtained by electrochemical treatment in Example 1.

Thus obtained exfoliated graphite was dried and a multi-layer structure of the exfoliated graphite was evaluated by XRD measurement. An XDR pattern of the exfoliated graphite is shown in FIG. 7. A slight amount of a graphite multi-layer structure was observed.

Figure 8:
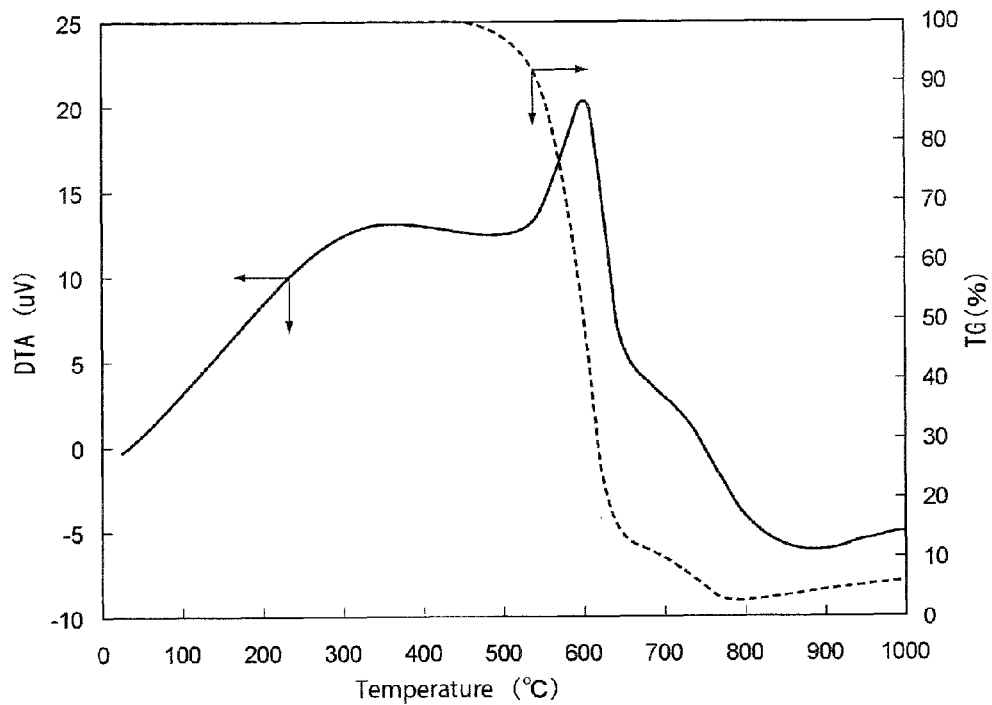
FIG. 8 is a chart illustrating TG/DTA measurement result of exfoliated graphite obtained in Example 1.

The exfoliated graphite obtained above was cut into 1-cm square and one of the pieces of cut exfoliated graphite was placed in a carbon melting pot to carrying out electromagnetic induction heating treatment. MU1700D manufactured by SK Medical Electronics Co., Ltd. was used as an induction heating device, and the treatment was carried out under an argon atmosphere at a current of 10 A so that a maximum temperature reached was 550° C. Thin layer of the exfoliated graphite was formed by the electromagnetic induction heating, and a specific surface area of the obtained exfoliated graphite powder was measured by using a specific surface area measuring apparatus ASAP-2000 manufactured by SHIMADZU CORPORATION using nitrogen gas. The result indicated a specific surface area of 697 $m^2/g$. A result of TG/DTA measurement of the obtained exfoliated graphite is shown in FIG. 8. Together with development of delamination, it was observed that the decomposition temperature became lower.

Figure 9:
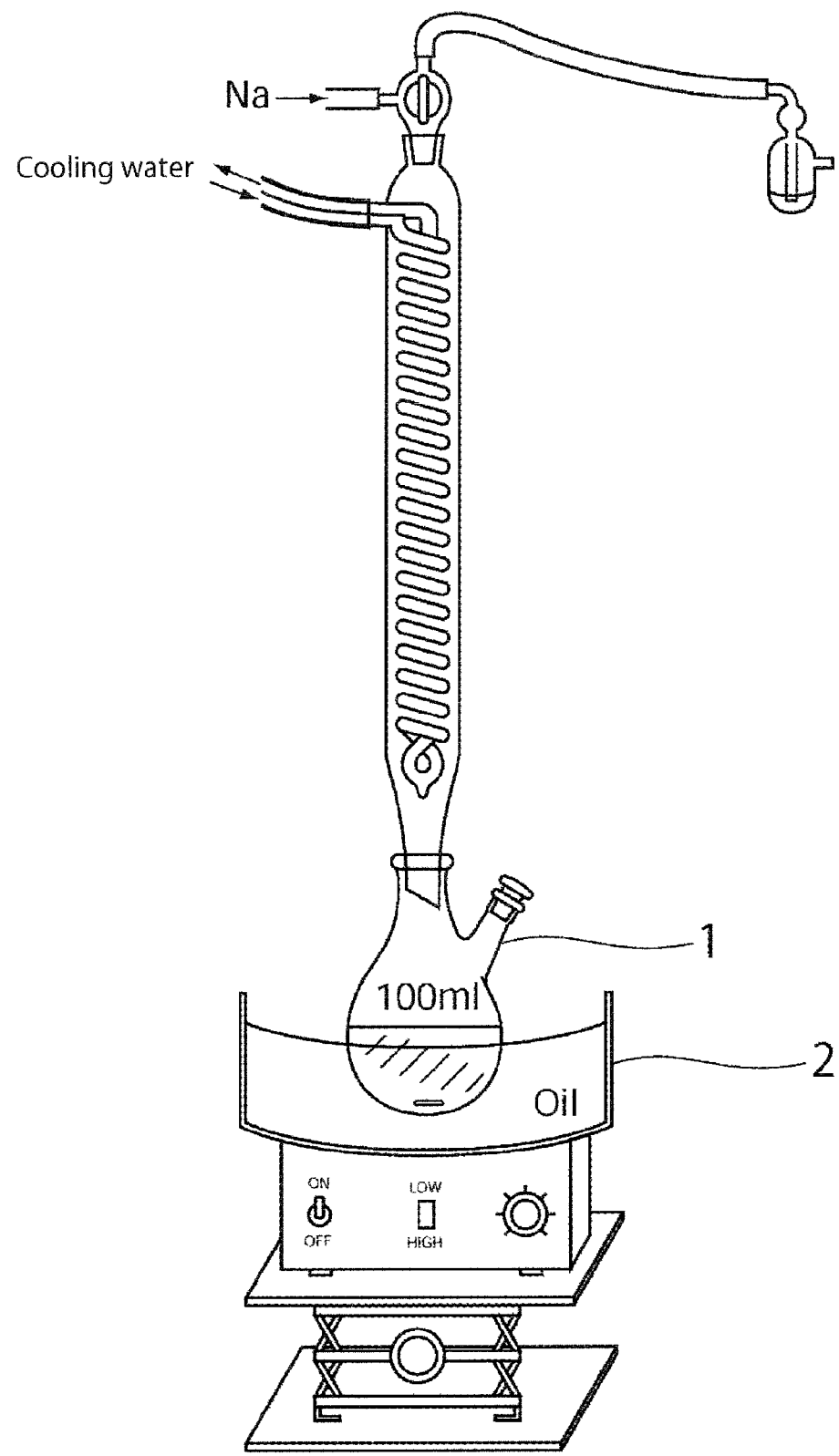
FIG. 9 is a schematic view illustrating a reflux apparatus used in Examples 1 to 3.

Into a two-necked recovery flask having a capacity of 100 ml, 0.25 g of the graphene and 40 g of decalin were charged and ultrasonic treatment was carried out to obtain a dispersed mixture. In the ultrasonic treatment, W-113 SANPA manufactured by Honda Electronics was used. The treatment was carried out at an output of 100 W and an oscillating frequency of 28 kHz for 40 minutes. The recovery flask containing the dispersed mixture was attached to a reflux apparatus shown in FIG. 9, and this recovery flask was served as a recovery flask 1. Into the dispersed mixture in the recovery flask 1, a syringe was inserted and the decalin solvent was bubbled with nitrogen for 10 minutes. Into this flask, 10 g of an α-lipoic acid (manufactured by Oryza Oil & Fat Chemical Co., Ltd., P type) was charged and subsequently the dispersed mixture was directly bubbled with nitrogen for 20 minutes.

This recovery flask 1 was immersed into an oil bath 2. The temperature of the oil bath 2 was raised to 100° C. and the dispersed mixture was heated for 4 hours. Polymerization of the α-lipoic acid proceeded and the dispersed mixture became viscous. Subsequently, the temperature of the oil bath 2 was raised to 170° C. and dispersed mixture was heated for 4 hours to carry out thermal decomposition grafting treatment. After the thermal decomposition, the reactant was allowed to cool overnight, and the recovery flask 1 was detached from the reflux apparatus.

To this recovery flask 1, 100 g of tetrahydrofuran was added and mixed with the dispersed mixture and the resultant mixture was treated with ultrasonic wave. As an ultrasonic treatment apparatus, W-113 SANPA manufactured by Honda Electronics was used. The treatment was carried out at an output of 100 W and an oscillating frequency of 28 kHz for 60 minutes.

The dispersed mixture having black color was taken out and filtered using PTFE-T300A090C having a pore size of 3 μm manufactured by Advantech Japan, Co., Ltd. with aspirator suction. A filter residue was re-dispersed in THF and dried at 80° C. for 2 hours, and thereafter, TG/DTA measurement was carried out under an air atmosphere.

Figure 10:
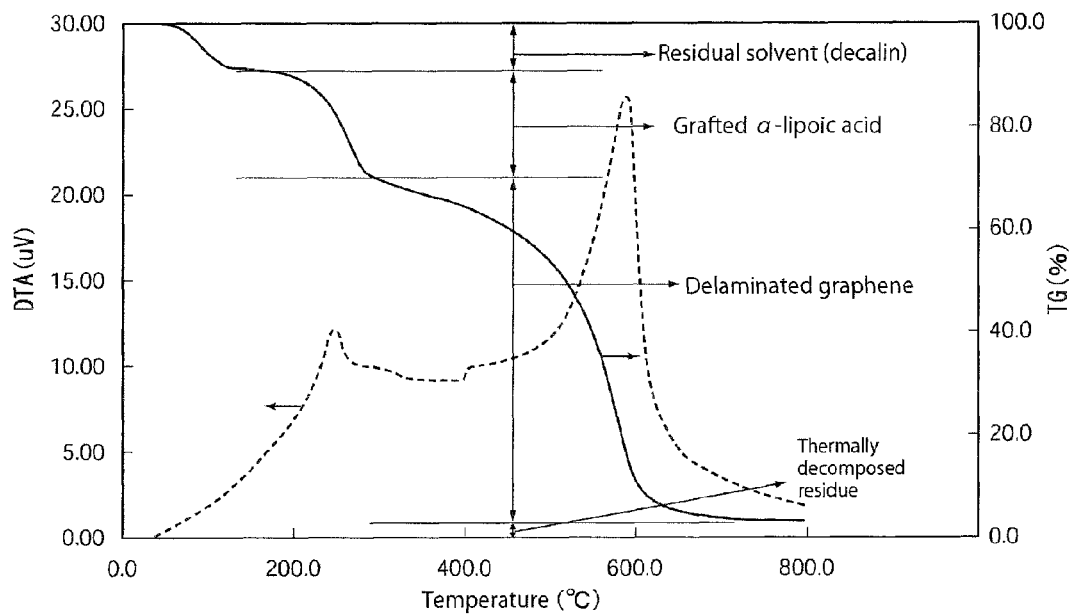
FIG. 10 is a chart illustrating TG/DTA measurement result of a carbonaceous material-polymer composite material obtained in Example 1.

The obtained result is shown in FIG. 10. As shown in FIG. 10, a peak due to exfoliated graphite was 62% and a peak due to a grafted polymer was 23%; and a peak of a residual solvent (due to decalin) was 11% and a peak of a decomposed residue was 4%. A polymer grafting ratio was estimated to be 29.9% by weight.

Example 2

Into a two-necked recovery flask having a capacity of 100 ml, 0.25 g of ground exfoliated graphite manufactured by Toyo Tanso Co., Ltd., product name: PF8F and 40 g of decalin were charged and ultrasonic treatment was carried out to obtain a dispersed mixture. In the ultrasonic treatment, W-113 SANPA manufactured by Honda Electronics was used. The treatment was carried out at an output of 100 W and an oscillating frequency of 28 kHz for 40 minutes. The recovery flask containing the dispersed mixture was attached to a reflux apparatus shown in FIG. 8, and this recovery flask was served as a recovery flask 1. Into the dispersed mixture in the recovery flask 1, a syringe was inserted and the decalin solvent was bubbled with nitrogen for 10 minutes. Into this flask, 10 g of an α-lipoic acid (manufactured by Oryza Oil & Fat Chemical Co., Ltd., P type) was charged and subsequently the dispersed mixture was directly bubbled with nitrogen for 20 minutes.

This recovery flask 1 was immersed into an oil bath 2. The temperature of the oil bath 2 was raised to 100° C. and the dispersed mixture was heated for 4 hours. Polymerization of the α-lipoic acid proceeded and the solution became viscous. Subsequently, the temperature of the oil bath 2 was raised to 170° C. and dispersed mixture was heated for 4 hours to carry out thermal decomposition grafting treatment. After the thermal decomposition, the reactant was allowed to cool overnight, and the recovery flask 1 was detached from the reflux apparatus.

To this recovery flask 1, 100 g of tetrahydrofuran was added and mixed with the dispersed mixture and the resultant mixture was treated with ultrasonic wave. As an ultrasonic treatment apparatus, W-113 SANPA manufactured by Honda Electronics was used. The treatment was carried out at an output of 100 W and an oscillating frequency of 28 kHz for 60 minutes.

The dispersed mixture having black color was taken out and filtered using PTFE-T300A090C having a pore size of 3 μm manufactured by Advantech Japan, Co., Ltd. with aspirator suction. A filter residue was re-dispersed in THF and dried at 80° C. for 2 hours, and thereafter, TG/DTA measurement was carried out under an air atmosphere.

Figure 11:
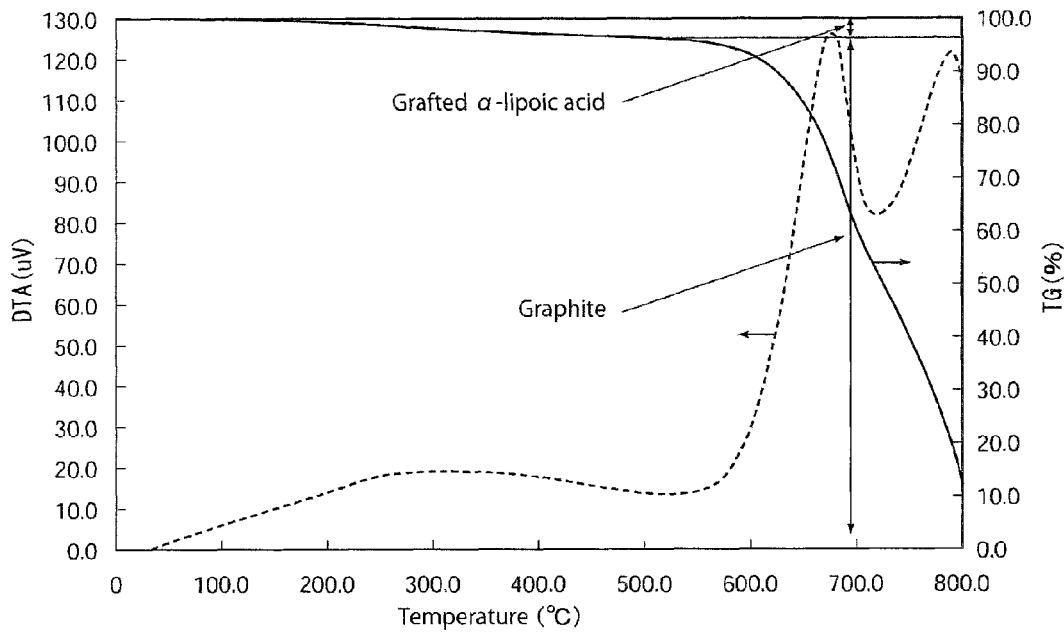
FIG. 11 is a chart illustrating TG/DTA measurement result of a carbonaceous material-polymer composite material obtained in Example 2.

The obtained result is shown in FIG. 11. As shown in FIG. 11, a peak due to exfoliated graphite was 96% and a peak due to a grafted α-lipoic acid was 4%. Therefore, it is found that α-lipoic acid-grafted graphite is obtained in which the α-lipoic acid is grafted onto the surface of graphene. A polymer grafting ratio was estimated to be 4% by weight.

Example 3

Into a two-necked recovery flask having a capacity of 100 ml, 53.1 mg of the α-lipoic acid-grafted graphite obtained in Example 2, 19.9 g of a styrene monomer, and 19.3 g of decalin were charged and ultrasonic treatment was carried out to obtain a dispersed mixture. In the ultrasonic treatment, W-113 SANPA manufactured by Honda Electronics was used, and the treatment was carried out at an output of 100 W and an oscillating frequency of 28 kHz for 30 minutes.

The recovery flask containing the dispersed mixture was attached to the reflux apparatus shown in FIG. 9 again, and this recovery flask was served as a recovery flask 1. Into the dispersed mixture in the recovery flask 1, a syringe was inserted and the decalin solvent was bubbled with nitrogen for 30 minutes.

This recovery flask 1 was immersed into an oil bath 2. The temperature of the oil bath 2 was raised to 100° C. and the dispersed mixture was heated for 46 minutes. The dispersed mixture was further heated at 130° C. for 28 minutes, further at 150° C. for 46 minutes, and at 170° C. for 70 minutes to carry out thermal decomposition grafting treatment. After the thermal decomposition, the reactant was allowed to cool overnight, and the recovery flask 1 was detached from the reflux apparatus.

Subsequently, to this recovery flask, 40 g of tetrahydrofuran was added and mixed with the dispersed mixture and the resultant mixture was treated with ultrasonic wave. In the ultrasonic treatment, W-113 SANPA manufactured by Honda Electronics was used, and the treatment was carried out at an output of 100 W and an oscillating frequency of 28 kHz for 30 minutes.

Thereafter, the viscous dispersed mixture was taken out and filtered using PTFE-T300A090C having a pore size of 3 μm manufactured by Advantech Japan, Co., Ltd. with aspirator suction. A filter residue was re-dispersed in 60 g of THF and filtered. Thereafter, the filtered residue was dried at 80° C. for 2 hours and TG/DTA measurement was carried out under an air atmosphere.

Figure 12:
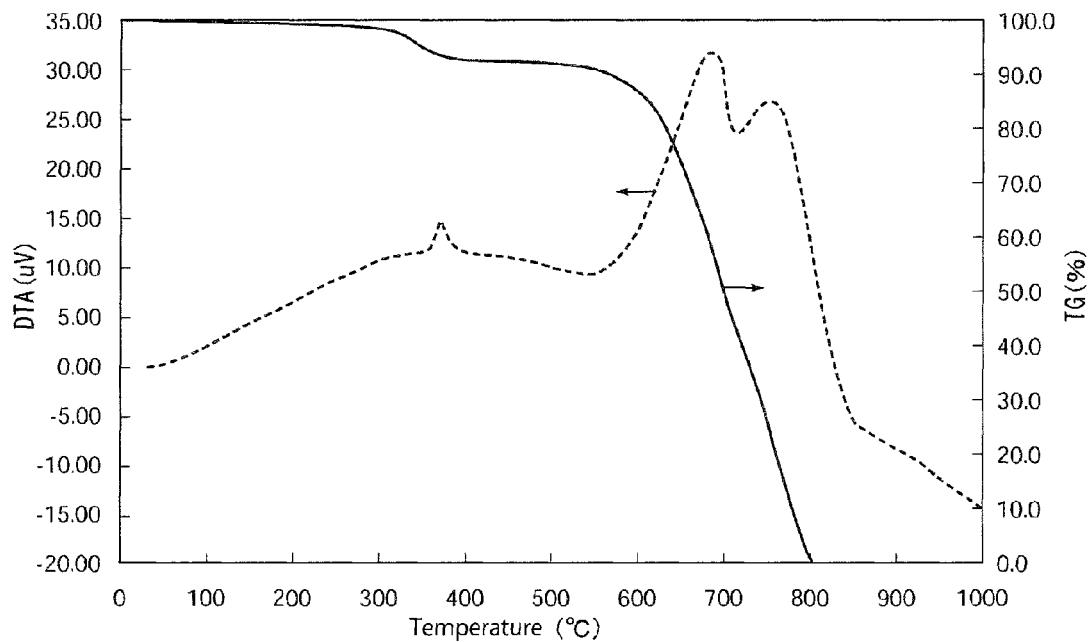
FIG. 12 is a chart illustrating TG/DTA measurement result of a carbonaceous material-polymer composite material obtained in Example 3.

The obtained result is shown in FIG. 12. A peak due to exfoliated graphite was 92% and a peak due to a grafted polymer was 8%.

In Example 2, a grafting ratio of the cyclic disulfide, that is, the α-lipoic acid was 4% by weight, and thus, a styrene polymer grafting ratio in Example 3 was estimated to be 4% by weight.

Example 4

Into a sample tube having a capacity of 100 ml, 50 mg of ground exfoliated graphite manufactured by Toyo Tanso Co., Ltd., product name: PF8F, 2.7 g of an α-lipoic acid, and 10 g of decalin were charged and ultrasonic treatment was carried out to obtain a dispersed mixture. In the ultrasonic treatment, W-113 SANPA manufactured by Honda Electronics was used. The treatment was carried out at an output of 100 W and an oscillating frequency of 28 kHz for 30 minutes. After a stirring bar was placed in the sample tube containing the dispersed mixture, the sample tube was heated over a hot plate of 150° C. for 2 hours with the dispersed mixture being stirred.

Subsequently, after the sample tube was cooled to room temperature, 10 g of a styrene monomer was added and the ultrasonic treatment was carried out for 30 minutes. Subsequently, the sample tube was placed on a hot plate of 240° C. and heated for 2 hours. Further, the sample tube was transferred to another hot plate of 150° C. and heated at 150° C. for 2 hours. After the treatment at 240° C. was carried out again for 2 hours, heating treatment at 150° C. was further carried out for 2 hours. As described above, the heating treatment at 150° C. and 240° C. was repeatedly carried out. After a series of such heating treatment, the sample tube was gradually cooled overnight.

Subsequently, 50 ml of toluene was added to the sample tube and mixed with the dispersed mixture and the resultant mixture was treated with ultrasonic wave. In the ultrasonic treatment, W-113 SANPA manufactured by Honda Electronics was used, and the treatment was carried out at an output of 100 W and an oscillating frequency of 28 kHz for 30 minutes.

Thereafter, the dispersed mixture having black color was taken out and filtered using PTFE-T300A090C having a pore size of 3 μm manufactured by Advantech Japan, Co., Ltd. with aspirator suction. A filter residue was re-dispersed in 60 g of THF and filtered. Thereafter, the filtered residue was dried at 80° C. for 2 hours and TG/DTA measurement was carried out under an air atmosphere.

Figure 13:
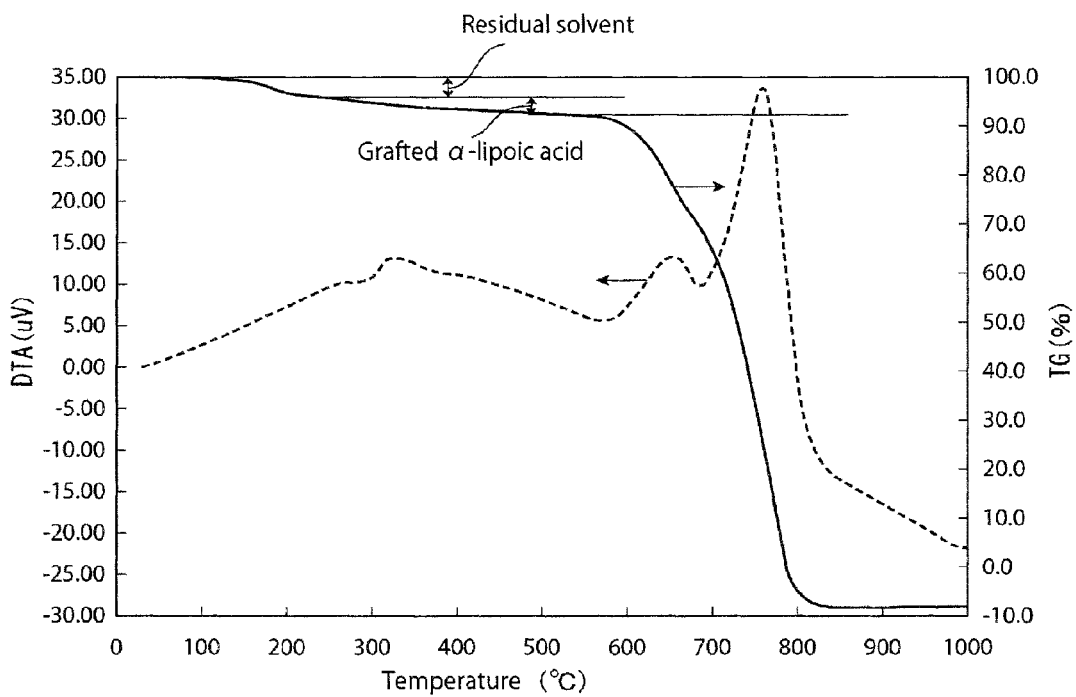
FIG. 13 is a chart illustrating TG/DTA measurement result of a carbonaceous material-polymer composite material obtained in Example 4.

The obtained result is shown in FIG. 13. As shown in FIG. 13, a peak due to exfoliated graphite was 92% and a peak due to a grafted α-lipoic acid was 4%. Therefore, it is found that grafted graphite is obtained in which the α-lipoic acid and styrene are grafted onto the surface of graphene. A polymer grafting ratio was estimated to be 4.3% by weight.

REFERENCE SIGNS LIST

1 RECOVERY FLASK
2 OIL BATH

The invention claimed is:

1. A method for producing a carbonaceous material-polymer composite material; the method comprising the steps of: preparing a mixture containing a graphite and at least one polymer A of a polymer obtained by polymerizing a cyclic disulfide compound and a polymer obtained by polymerizing a cyclic disulfide compound and a radical polymerizable functional group-containing monomer; and heating the mixture at a temperature range of D° C. or higher to a decomposition termination temperature or lower when a decomposition start temperature of the polymer A is defined as D° C. to obtain exfoliated graphite by delamination of the graphite and graft the polymer A to the exfoliated graphite,
wherein the decomposition start temperature is a temperature at which 10% by weight of the polymer A is decomposed under a nitrogen atmosphere,
wherein the decomposition termination temperature is a temperature at which 90% by weight of the polymer A is decomposed under a nitrogen atmosphere.

2. The method for producing a carbonaceous material-polymer composite material according to claim 1, wherein the step of preparing the mixture is carried out by mixing the graphite and the polymer A.

3. The method for producing a carbonaceous material-polymer composite material according to claim 1, wherein the step of preparing the mixture comprises the steps of: obtaining the polymer A by polymerizing the cyclic disulfide compound with heat; and mixing the graphite before or after the polymerization of the cyclic disulfide compound.

4. The method for producing a carbonaceous material-polymer composite material according to claim 1, the method further comprising the step of cooling the mixture to a temperature lower than (D-75)° C. after the heating step when the decomposition start temperature of the polymer A is defined as D° C.

5. The method for producing a carbonaceous material-polymer composite material according to claim 1, the method further comprising the step of repeating the heating step and the cooling step for a plurality of times.

6. The method for producing a carbonaceous material-polymer composite material according to claim 1, wherein the cyclic disulfide compound is at least one compound selected from the group consisting of 1,2-dithiane represented by the following chemical formula (1), a lipoic amide represented by the following chemical formula (2), 1,2-dithiacyclodecane represented by the following chemical formula (3), 1,4-dihydro-2,3-benzodithine represented by the following chemical formula (4), dithiacyclopentane, 1,2-dithiacyclooctane, a lipoic amide, and derivatives thereof

[Chemical Formula 1]

(1)

[Chemical Formula 2]

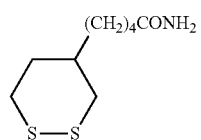

(2)

[Chemical Formula 3]

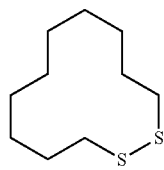

(3)

[Chemical Formula 4]

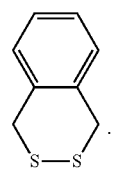

(4)

7. The method for producing a carbonaceous material-polymer composite material according to claim 1, wherein the cyclic disulfide compound has a functional group bonded to a carbon atom in a cyclic skeleton.

8. The method for producing a carbonaceous material-polymer composite material according to claim 7, wherein the cyclic disulfide compound is at least one compound selected from the group consisting of an α-lipoic acid, a lipoic amide, and a modified compound thereof.

9. The method for producing a carbonaceous material-polymer composite material according to claim 1, wherein two or more kinds of cyclic disulfide compounds are used as the cyclic disulfide compound.

10. The method for producing a carbonaceous material-polymer composite material according to claim 1, wherein two or more kinds of polymers A are used as the polymer A.

11. The method for producing a carbonaceous material-polymer composite material according to claim 1, wherein the radical polymerizable functional group-containing monomer is a vinyl group-containing monomer.

12. The method for producing a carbonaceous material-polymer composite material according to claim 1, wherein carbon dioxide or water in a supercritical state is added and mixed in at least a part of the heating step.

13. The method for producing a carbonaceous material-polymer composite material according to claim 1, wherein the mixture does not contain a polymerization initiator.

14. A carbonaceous material-polymer composite material obtained by the method for producing a carbonaceous material-polymer composite material according to claim 1, wherein a monomer and/or a polymer derived from the polymer A is grafted to the exfoliated graphite.

15. The carbonaceous material-polymer composite material according to claim 14, wherein a monomer and/or a polymer derived from the polymer A having a functional group is grafted to the exfoliated graphite.

* * * * *